United States Patent
Jung et al.

(10) Patent No.: US 7,651,670 B2
(45) Date of Patent: *Jan. 26, 2010

(54) METHOD FOR CONTINUOUSLY POLYMERIZING IN MASS QUANTITIES AND TAYLOR REACTOR FOR CARRYING OUT THIS METHOD

(75) Inventors: Werner-Alfons Jung, Ascheberg (DE);
Heinz-Peter Rink, Münster (DE);
Heinrich Meinecke, Münster (DE);
Josef Krull, Beckum (DE)

(73) Assignee: BASF Coatings AG, Munster (DE)

( * ) Notice: Subject to any disclaimer, the term of this patent is extended or adjusted under 35 U.S.C. 154(b) by 466 days.

This patent is subject to a terminal disclaimer.

(21) Appl. No.: 10/486,893
(22) PCT Filed: Oct. 2, 2002
(86) PCT No.: PCT/EP02/11033

§ 371 (c)(1),
(2), (4) Date: Feb. 17, 2004

(87) PCT Pub. No.: WO03/031056
PCT Pub. Date: Apr. 17, 2003

(65) Prior Publication Data
US 2005/0159565 A1    Jul. 21, 2005

(30) Foreign Application Priority Data
Oct. 4, 2001   (DE) ............................... 101 49 015

(51) Int. Cl.
*B01J 8/08* (2006.01)
*B01J 8/02* (2006.01)
*B01J 19/00* (2006.01)
*B01J 19/18* (2006.01)
*B01D 19/00* (2006.01)
*C08G 85/00* (2006.01)
*C08F 4/00* (2006.01)
*C08F 210/00* (2006.01)

(52) U.S. Cl. .................. 422/209; 422/211; 422/213; 422/215; 422/224; 422/225; 422/229; 526/348; 526/90; 526/72

(58) Field of Classification Search ............... 422/209, 422/211, 213, 215, 224, 225, 229; 526/348, 526/90, 72
See application file for complete search history.

(56) References Cited

U.S. PATENT DOCUMENTS
4,174,907 A    11/1979  Suh et al.
(Continued)

FOREIGN PATENT DOCUMENTS
DE    19828742    12/1999
(Continued)

OTHER PUBLICATIONS

English Abstract for DE19960389 from EPO, Jul. 5, 2001.
U.S. Appl. No. 09/719,874, filed Jan. 4, 2001, Moritz et al.

*Primary Examiner*—William K Cheung
(74) *Attorney, Agent, or Firm*—Cantor Colburn LLP

(57) ABSTRACT

A Taylor reactor (1) according to FIG. 1, comprising
1. an annular reaction volume (2) which widens in the flow direction and is defined by an outer reactor wall (3), a rotor (4) which is mounted rotatably at the end (4.1) in the reactor floor (5) and at its other end (4.2) is unmounted, and a reactor floor (5) having a seal (6) for the drive shaft (7),
2. an inlet region (8) above the reactor floor (5), having at least one side feed (8.1) and/or at least one feed (8.1) through the reactor floor (5) for the reactants and/or the process media,
3. an outlet region (9) which is disposed above the annular reaction volume (2), widens further beyond the annular reaction volume (2) in the flow direction, and subsequently tapers toward a product offtake (10),
4. a product offtake (10) which at its greatest diameter opens toward the outlet region (9) and tapers in the other direction, and
5. a pressure maintenance valve (11);
and its use for continuous bulk polymerization.

24 Claims, 1 Drawing Sheet

U.S. PATENT DOCUMENTS

| | | | |
|---|---|---|---|
| 4,553,922 A | 11/1985 | Winner | |
| 5,188,808 A * | 2/1993 | Lilja et al. | 422/229 |
| 5,278,253 A | 1/1994 | Baumgartner et al. | |
| 5,340,891 A | 8/1994 | Imamura et al. | |
| 5,576,386 A * | 11/1996 | Kempter et al. | 526/88 |
| 5,618,580 A | 4/1997 | Oshima et al. | |
| 5,846,498 A | 12/1998 | Kingsley | |
| 7,122,161 B1 * | 10/2006 | Moritz et al. | 422/209 |
| 2006/0062702 A1 * | 3/2006 | Hagemeister et al. | 422/131 |
| 2006/0204406 A1 * | 9/2006 | Jung et al. | 422/131 |

FOREIGN PATENT DOCUMENTS

| | | | |
|---|---|---|---|
| DE | 19960389 | | 7/2001 |
| GB | 799039 | | 7/1958 |
| GB | 875796 | | 8/1961 |
| GB | 1358157 | | 6/1974 |
| GB | 2103229 | | 2/1983 |
| GB | 2215327 | | 9/1989 |
| WO | WO94/11096 | | 5/1994 |
| WO | WO98/22524 | | 5/1998 |
| WO | WO 00/00280 | * | 1/2000 |

* cited by examiner

METHOD FOR CONTINUOUSLY POLYMERIZING IN MASS QUANTITIES AND TAYLOR REACTOR FOR CARRYING OUT THIS METHOD

CROSS REFERENCE TO RELATED APPLICATIONS

This application is a National Phase Application of Patent Application PCT/EP02/11033 filed 2 Oct. 2002, which claims priority to DE 101 49 015.1, filed on 4 Oct. 2001.

BACKGROUND

The present invention relates to a novel process for continuous preparation of (co)polymers, block copolymers and graft copolymers of at least one olefinically unsaturated monomer by (co)polymerization, block copolymerization and graft copolymerization in bulk. The present invention also relates to a novel Taylor reactor for implementing this process.

In the text below, (co)polymerization, block copolymerization and graft copolymerization are referred to collectively as "polymerization". Accordingly, the (co)polymers, block copolymers and graft copolymers are referred to collectively as "polymers".

As is known, olefinically unsaturated monomers are polymerized continuously in bulk by a free-radical, anionic or cationic method in the presence or absence of small amounts—i.e., up to 25% by weight of the reaction mixture— of organic solvents. In the course of the polymerization reaction, the kinematic viscosity ν changes by a factor of at least 10, so that the handling of the polymers becomes difficult. It is therefore often necessary to take the polymerization only to a comparatively low conversion, for example, a maximum of 70 mol %, so that the reaction mixtures comprising polymers and monomers can still be mixed thoroughly and discharged from the reactors. It is then necessary to separate the unreacted monomers from the polymers, something which is complex and expensive from the standpoints of safety, energy, and process engineering. Monomers whose volatility is low can in many cases not be separated off at all, with the consequence that the monomer content of the polymers remains undesirably high.

In the German patent application DE 198 28 742 A1 it is proposed to conduct the polymerization of olefinically unsaturated monomers in bulk in a Taylor reactor under the conditions of Taylor vortex flow.

Taylor reactors, which serve to convert substances under the conditions of Taylor vortex flow, have been known for a long time. They consist essentially of two coaxial concentric cylinders of which the outer is fixed while the inner rotates. The reaction space is the volume formed by the gap between the cylinders. Increasing angular velocity $\omega_i$ of the inner cylinder is accompanied by a series of different flow patterns which are characterized by a dimensionless parameter, known as the Taylor number Ta. As well as the angular velocity of the stirrer or rotor, the Taylor number is also a function of the kinematic viscosity ν of the fluid in the gap and of the geometric parameters, the external radius of the inner cylinder, $r_i$, the internal radius of the outer cylinder, $r_o$, and the gap width d, the difference between the two radii, in accordance with the following formula:

$$Ta = \omega_i r_i d \nu^{-1} (d/r_i)^{1/2} \qquad (I)$$

Where $d = r_o - r_i$.

At low angular velocity, the laminar Couette flow, a simple shear flow, develops. If the rotary speed of the inner cylinder is increased further, then, above a critical level, alternately contrarotating vortices (rotating in opposition) occur, with axes along the peripheral direction. These vortices, called Taylor vortices, are rotationally symmetric, possess the geometric form of a torus (Taylor vortex ring), and have a diameter which is approximately the same size as the gap width. Two adjacent vortices form a vortex pair or a vortex cell.

The basis of this behavior is the fact that, in the course of rotation of the inner cylinder with the outer cylinder at rest, the fluid particles that are near to the inner cylinder are subject to a greater centrifugal force than those at a greater distance from the inner cylinder. This difference in the acting centrifugal forces displaces the fluid particles from the inner to the outer cylinder. The centrifugal force acts counter to the viscosity force, since for the motion of the fluid particles it is necessary to overcome the friction. If there is an increase in the rotary speed, there is also an increase in the centrifugal force. The Taylor vortices are formed when the centrifugal force exceeds the stabilizing viscosity force.

If the Taylor reactor is provided with an inlet and an outlet and is operated continuously, the result is a Taylor vortex flow with a low axial flow. Each vortex pair passes through the gap, with only a low level of mass transfer between adjacent vortex pairs. Mixing within such vortex pairs is very high, whereas axial mixing beyond the pair boundaries is very low. A vortex pair may therefore be regarded as a stirred tank in which there is thorough mixing. Consequently, the flow system behaves like an ideal flow tube in that the vortex pairs pass through the gap with constant residence time, like ideal stirred tanks.

If, however, there is a sharp change in the viscosity ν of the fluid in the axial flow direction as conversion progresses, as is the case with polymerization in bulk, the Taylor vortices disappear or are not even formed. In that case, Couette flow, a concentric, laminar flow, is observed in the annular gap. There is an unwanted change in the mixing and flow conditions within the Taylor reactor. In this operating stage it exhibits flow characteristics which are comparable with those of the laminarly flow-traversed tube, which is a considerable disadvantage. For example, in the case of polymerization in bulk, there is an undesirably broad molecular mass distribution and chemical polydispersity of the polymers. Moreover, the poor reaction regime may result in considerable amounts of residual monomers, which then have to be discharged from the Taylor reactor. However, there may also be instances of coagulation and polymer deposition, which in some cases may even lead to blockage of the reactor or of the product outlet. Overall, it is no longer possible to obtain the desired products, such as polymers of comparatively narrow molecular mass distribution, but only those whose profile of properties does not meet the requirements.

In order to solve these problems, a Taylor reactor was provided having a) an external reactor wall located within which there is a concentrically disposed rotor, a reactor floor and a reactor lid, which together define the annular reactor volume, b) at least one means for metered addition of reactants, and c) a means for the discharge of the product, where d) during the polymerization there is a change in the viscosity ν of the reaction medium and e) the reactor wall and/or the rotor are or is geometrically designed in such a way that the conditions for Taylor vortex flow are met over substantially the entire reactor length in the reactor volume.

Condition e) is met by the annular reactor volume widening, in particular widening conically, in the direction of flow traversal. As a result, the known Taylor reactor is able substantially to solve the problem of maintaining the Taylor flow when there is a sharp increase in the kinematic viscosity ν in the reaction medium.

In the known Taylor reactor, the annular reactor volume is defined by the concentrically disposed rotor, the reactor floor, and the reactor lid. This means that the product outlet must be disposed at the side of the Taylor reactor or in the reactor lid and cannot be designed without edges. With this configuration, however, an undisrupted product discharge is difficult to realise, since edges and dead spaces result in deposition of polymers. Moreover, in this area, the Taylor flow which is still present in the highly viscous reaction medium may easily collapse, thereby impairing the mixing of monomers and polymers and increasing the likelihood of deposition at edges and in dead spaces.

In the known Taylor reactor, furthermore, the passage of the drive shaft for the rotor is rotated in the reactor lid. This means that the rotor is driven in the area in which the kinematic viscosity ν is at its highest. As a result, the seals and connections are subject to a particularly high mechanical load.

Owing to the disadvantageous combined effect of flow and geometric configuration, on the one hand the known Taylor reactor is unable to solve all of the safety and process engineering problems which occur in connection with polymerization in bulk and on the other hand it is still not possible to increase the monomer conversion to an extent where substantial freedom from monomers and a narrow molecular weight distribution and molecular weight polydispersity of the polymers are achieved.

It is true that the problem of insufficient mixing of the reactants may be solved to a certain degree by inserting a mixer upstream of the entry point for the reactants, as is described in the German patent application DE 199 60 389 A1. However, the problems set out above continue to occur in the outlet region in the case of polymerization in bulk.

The American patent U.S. Pat. No. 4,174,907 A discloses a Taylor reactor in which the rotor is mounted rotatably in the inlet region of the reactants. At its other end, the rotor is not mounted but instead ends substantially before the outlet region, which at its broadest point has the same diameter as the outer reactor wall. The outlet region narrows in the form of a funnel to an outlet pipe. The known Taylor reactor is used to mix liquids of different viscosity and electrical conductivity. Moreover, it may be used for the reaction of polyisocyanates with polyols. To what extent it can be used for the polymerization of olefinically unsaturated monomers in bulk, the American patent does not reveal.

In the known Taylor reactor, the drive shaft is passed through the reactor floor and is connected to the rotor in the inlet region of the reactants. However, in the inlet region of the reactants the rotor does not have the diameter which would be necessary in order to establish Taylor flow in this region. Moreover, the annular reaction volume does not widen in the direction of flow traversal. It is true that the American patent does specify, in column 10 lines 29 to 33, that the concentric parts may also have configurations other than the cylindrical—for example, substantially spherical or conical—configurations, but there is no teaching as to what configurations are of particular advantage for polymerization in bulk.

It is an object of the present invention to provide a novel Taylor reactor which no longer has the disadvantages of the prior art but which is instead especially suitable for the polymerization of olefinically unsaturated monomers in bulk, in the course of which the kinematic viscosity ν in the reaction medium multiplies by a factor of at least 10 in the course of the reaction. The novel Taylor reactor should readily permit the preparation of polymers with a conversion >70 mol % without being accompanied by the formation of gas bubbles and/or the deposition of polymers in the annular reaction volume and/or in the outlet region. Furthermore, the novel Taylor reactor should have a particularly long operational duration and service life.

SUMMARY OF THE INVENTION

The invention accordingly provides the novel Taylor reactor (1), which comprises
1. an annular reaction volume (2) which
    1.1 widens in the flow direction of the reaction medium and opens into an outlet region (9) and is defined by
        1.1.1 an outer reactor wall (3),
        1.1.2 a concentrically disposed rotor (4) which at one end (4.1) is mounted rotatably in the reactor floor (5) and at its other end (4.2) below the outlet region (9) is unmounted, the rotor (4) having the largest diameter at its mounted end (4.1) or having the same diameter as at its unmounted end (4.2), and
        1.1.3 a reactor floor (5) having a seal (6) for the drive shaft (7),
2. an inlet region (8) in the narrowest region of the annular reaction volume (2) above the reactor floor (5), having at least one side feed (8.1) and/or at least one feed (8.1) through the reactor floor (5) for the reactants and/or the process media,
3. a deadspace-free outlet region (9) which
    3.1 is disposed above the unmounted end (4.2) of the rotor (4) and above the annular reaction volume (2),
    3.2 widens further or remains constant beyond the annular reaction volume (2) in the flow direction, and
    3.3 thereafter narrows to a product offtake (10),
4. a deadspace-free product offtake (10) which
    4.1 at its greatest diameter opens toward the outlet region (9) and
    4.2 tapers in the other direction,
and
5. at the end (10.1) of the product offtake (10) opposite the outlet region (9), a pressure maintenance valve (11).

In the text below, the novel Taylor reactor is referred to as the "Taylor reactor of the invention".

The invention also provides the novel process for continuous preparation of (co)polymers, block copolymers and graft copolymers by free-radical, anionic or cationic (co)polymerization, block copolymerization or graft copolymerization (polymerization) of at least one olefinically unsaturated monomer in bulk in a Taylor reactor which involves
(I) metering at least one olefinically unsaturated monomer via at least one side feed (8.1) and/or at least one feed (8.1) through the reactor floor (5) into the inlet region (8) of the Taylor reactor (1) of the invention, the inlet region (8) being situated in the narrowest region of the annular reaction volume (2) above the reactor floor (5), and
(II) carrying out (co)polymerization, block copolymerization or graft copolymerization (polymers 4) in the annular reaction volume (2) at least partly under the conditions of Taylor flow, where the annular reaction volume (2)
    1.1 widens in the flow direction of the reaction medium and opens into the outlet region (9) and is defined by 1.1.1 the outer reactor wall (3), 1.1.2 the concentrically disposed rotor (4) which at one end (4.1) is mounted rotatably in the reactor floor (5) and at its other end (4.2) below the outlet region (9) is unmounted, the rotor (4) having the largest diameter at its mounted end (4.1) or having the same diameter as at its unmounted end (4.2), and 1.1.3 the reactor floor (5) having the seal (6) for the drive shaft (7), (III) conveying the resulting liquid (co)polymer, block copolymer or graft copolymer (polymer) from the annular reaction volume (2) into the deadspace-free outlet region (9), which 3.1 is disposed above the unmounted end (4.2) of the rotor (4) and above the annular reaction volume (2), 3.2 widens further or remains constant beyond the annular reaction volume (2) in the flow direction, and 3.3 thereafter narrows to the product offtake (10), (IV) conveying the polymer from the outlet region (9) into the deadspace-free product offtake (10), which 4.1 at its greatest diameter opens toward the outlet region (9) and 4.2 tapers in the other direction, and (V) discharging the product by way of the pressure maintenance valve (11) situated at the end (10.1) of the product offtake (10) opposite the outlet region (9).

In the text below, the novel process for continuous preparation of (co)polymers, block copolymers and graft copolymers by free-radical, anionic or cationic polymerization of at least one olefinically unsaturated monomer in bulk in a Taylor reactor is referred to as the "process of the invention".

DETAILED DESCRIPTION

Figure 1:
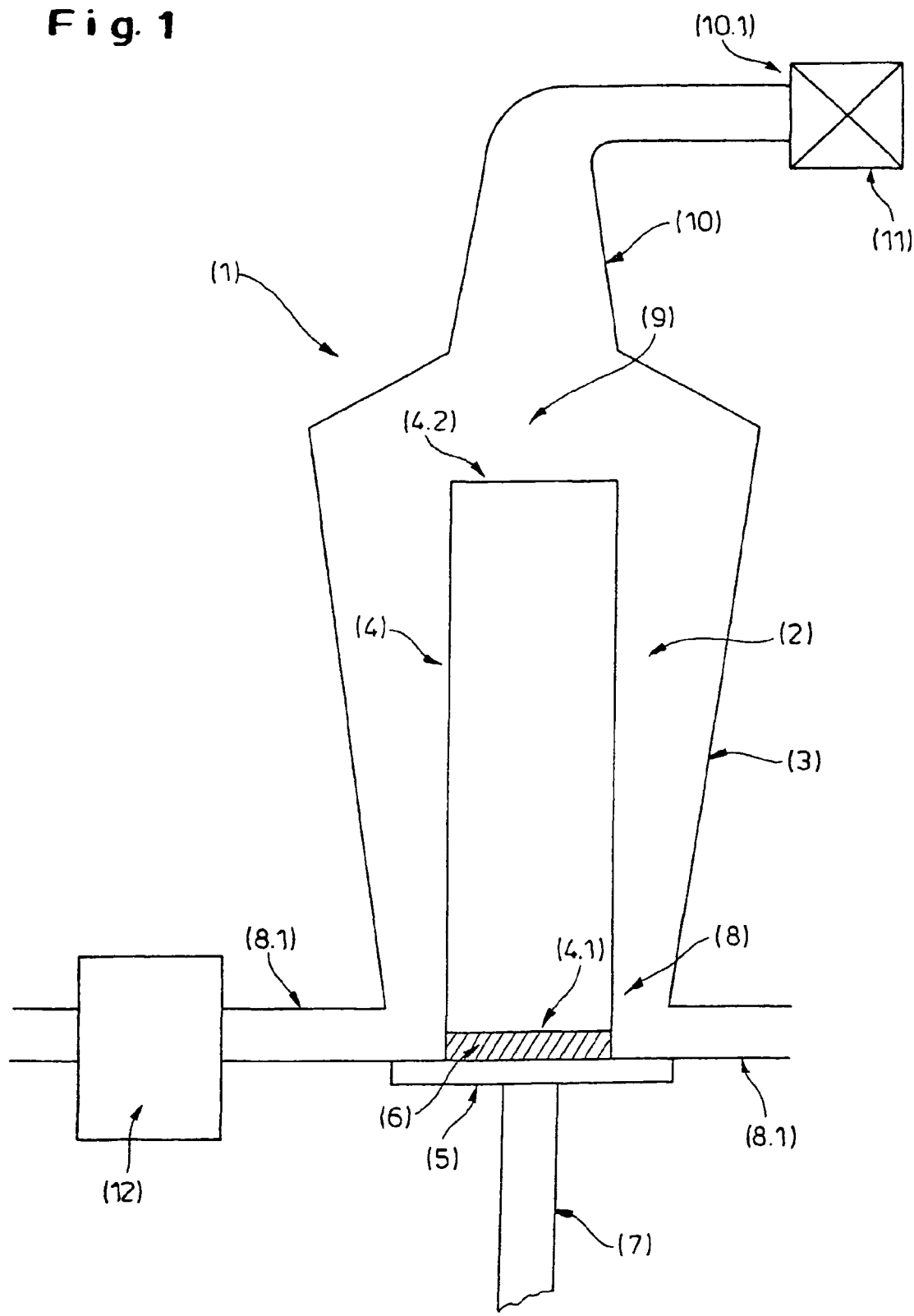
FIG. 1 is a schematic drawing of a Taylor reactor.

In the light of the prior art it was surprising and unforeseeable for the skilled worker that the object on which the present invention was based could be achieved by means of the Taylor reactor of the invention and by means of the process of the invention.

The Taylor reactor of the invention was surprisingly suitable for all transformations of matter where there was a sharp change in the kinematic viscosity v of the reaction medium in the direction of flow traversal.

A particular surprise was that the Taylor reactor of the invention and the process of the invention allowed the free-radical, anionic and cationic (co)polymerization, graft copolymerization and block copolymerization (collectively termed "polymerization") of olefinically unsaturated monomers in bulk with conversions >70 mol %. Even more surprising was that conversions >98 mol % could be achieved without problems without the occurrence in the Taylor reactor of the invention of formation of disruptive gas bubbles and/or deposition of (co)polymers, graft copolymers and block copolymers (collectively termed "polymers").

A further surprise was that the Taylor reactor of the invention, owing to its advantageous construction, and particularly its advantageous configuration in the inlet region (8), in the outlet region (9) and in the product offtake (10), and also the sealing (6) of the drive shaft (7) of the rotor (4) in the region of the annular reaction volume (2) in which the reaction medium had the lowest kinematic viscosity v, had a particularly long operational duration and service life.

A further surprise was that the Taylor reactor of the invention and the process of the invention permitted a particularly safe reaction regime of polymerization in bulk, thereby allowing the polymers to be prepared very safely, reliably and reproducibly. Owing to the very low monomer contents of the polymers, it was possible to pass them on for any of a very wide variety of end uses without further purification and without the occurrence of safety-related, process-related, toxicological or environmental problems or instances of odor nuisance.

The Taylor reactor of the invention comprises an annular reaction volume which preferably has a circular circumference. The annular reaction volume is defined by or formed by an outer reactor wall, a rotor disposed concentrically therein, and a reactor floor with a seal for the drive shaft of the rotor.

Viewed in cross section, the outer reactor wall and the rotor have a circular circumference over the entire length of the reaction volume. The term "circular" means strictly circular, oval, elliptical or multiangular with rounded corners. For reasons of greater facility of production, simplicity of construction, and the significantly simpler maintenance of constant conditions over the entire length of the annular reaction volume, a strictly circular circumference is of advantage.

In accordance with the invention, the internal wall of the outer reactor wall and/or the surface of the rotor are or is smooth, or rough, i.e., the surfaces in question have a low or high surface roughness. Additionally or alternatively, the internal wall of the outer reactor wall and/or the surface of the rotor have or has a relieflike radial and/or axial, preferably radial, surface profile, as is described, for example, in the American patent U.S. Pat. No. 4,174,907 A or in the British patent GB 1 358 157. If there is a radial surface profile, it is advantageously of approximately or precisely the same dimensions as the Taylor vortex rings.

In accordance with the invention it is of advantage for the internal wall of the outer reactor wall and the surface of the rotor to be smooth and without profile, in order to prevent dead corners in which gas bubbles or reactants, process media and products might settle.

Viewed in the lengthwise direction, the Taylor reactor of the invention is mounted vertically, horizontally, or in a position between these two directions. In accordance with the invention, vertical mounting is of advantage. If the Taylor reactor of the invention is not mounted horizontally, it may be traversed by the reaction medium flowing against gravity, from bottom to top, or with gravity, from top to bottom. In accordance with the invention it is of advantage if the reaction medium is moved counter to gravity.

In accordance with the invention, the annular reaction volume widens in the flow direction continuously or discontinuously, especially continuously, in accordance with appropriate mathematical functions. Examples of suitable mathematical functions are straight lines, at least two straight lines which intersect at an obtuse angle, parabolas, hyperbolas, e functions, or combinations of these functions, with continuous or discontinuous, especially continuous, transitions between them. Preferably, the mathematical functions are straight lines; that is, the annular reaction volume widens conically in the flow direction. The extent of widening is guided by the anticipated increase in viscosity of the reaction medium in the flow direction and may be estimated by the skilled worker on the basis of the Taylor formula I and/or determined by means of simple preliminary tests.

In the case of conical widening of the annular reaction volume, the outer reactor wall may be cylindrical and the rotor conical in shape, with the rotor having the greatest diameter at its mounted end. Alternatively, the outer reactor wall may be conical in shape and the rotor may be cylindrical, i.e., such that its cross section is constant over the entire length of the rotor. It is of advantage in accordance with the invention if the outer reactor wall is conical in shape and the rotor is cylindrical.

The rotor is mounted rotatably in the reactor floor. It and its drive shaft extending outwardly to a drive means are sealed with a seal. At its other end, the rotor is not mounted. The free end of the rotor may be planar, rounded off, or conical.

Preferably, the seal comprises a floating ring seal.

The drive means may comprise an infinitely adjustable electric motor or pneumatically operated motor which is connected to the drive shaft via a gear mechanism. The output of the motor is guided by the maximum kinematic viscosity v of the reaction medium. Connection to the drive shaft may take place by means of a magnetic coupling.

In the narrowest region of the annular reaction volume there is situated, above the reactor floor, at least one feed for the reactants, particularly for the olefinically unsaturated monomers, and for appropriate process media, such as catalysts and initiators. The feed may be disposed at the side or may pass through the reactor floor. Preferably there are at least two feeds which are disposed at the side and/or passed through the reactor floor. Where appropriate, further feeds may be provided in the flow direction, through which further reactants, catalysts or initiators may be metered in, so that the transformations of matter, especially the polymerization, may be conducted in a plurality of stages.

The reactants may be supplied to the feed by means of customary and known methods and means, such as metering pumps. The means may be furnished with the aid of customary and known mechanical, hydraulic, optical and electronic measurement and control devices. Furthermore, one of the mixing means such as is described, for example, in the German patent application DE 199 60 389 A1, column 4 line 55 to column 5 line 34, may be inserted upstream of the feed.

In the Taylor reactor of the invention, a deadspace-free outlet region is provided above the unmounted end of the rotor and above the annular reaction volume. In the flow direction, the outlet region widens beyond the annular reaction volume and then tapers to a product offtake. The widening may be described by the mathematical functions recited above, preference being given to straight lines. Accordingly, the outlet region preferably widens conically. The same applies to the tapering to the product offtake, i.e., the tapering is preferably conical.

The outlet region and the product offtake are defined by the outer reactor wall.

At its greatest diameter, the product offtake opens toward the outlet region and tapers in the other direction. Preferably, the product offtake has a strictly circular cross section. The opening of the product offtake may be arranged concentrically above the top end of the rotor or may be offset to the side of it. The tapering may be described by the mathematical functions recited above, preference being given to straight lines. Accordingly, the product offtake preferably tapers conically. After the tapering, the product offtake preferably becomes a cylindrical tube.

Disposed at the end of the product offtake opposite the outlet region is a pressure maintenance valve which builds up and regulates the pressure in the Taylor reactor of the invention and through which the reaction products, especially the polymers, are continuously discharged.

Arranged downstream of the pressure maintenance valve there may be collection and storage vessels, mixing means, such as melt emulsification means, cooling belts for producing granules, or further reactors.

The reactor wall in the inlet region, in the region of the annular reaction volume and in the outlet region, and the feed or feeds and the product offtake, may be equipped with a heating or cooling jacket in order to allow heating or cooling in cocurrent or in countercurrent. Furthermore, the Taylor reactor of the invention may include customary and known mechanical, hydraulic, optical and electronic measurement and control means, such as temperature sensors, pressure meters, flow meters, optical or electronic sensors and means for measuring concentrations, viscosities and other physicochemical variables, said means passing on their measurements to a data processing unit which controls the entire process sequence.

The Taylor reactor of the invention is preferably given a pressuretight design in order that the reaction medium may stand preferably under a pressure of from 1 to 100 bar. The Taylor reactor of the invention may consist of any of a wide variety of materials, provided these materials are not attacked by the reactants or reaction products and withstand relatively high pressure. It is preferred to use metals, preferably steel, especially stainless steel.

The Taylor reactor of the invention may be put to any of a very wide variety of end uses. It is preferably used for transformations of matter under the conditions of Taylor flow, where the kinematic viscosity v increases in the flow direction in the reaction medium.

A very particular advantage of the Taylor reactor of the invention is that the spatial succession in the Taylor reactor may be linked with the temporal succession of batchwise or semicontinuous (metering) processes. The Taylor reactor of the invention therefore offers the advantage of a continuous, quasi-"single-stage" process, so that a first reaction may take place in the first flow-traversed subsection of the Taylor reactor and a second, third, etc. reaction in a second or further subsection—as viewed in the axial flow direction—downstream of a further feed for the metering of reactants, catalysts, initiators and/or other suitable process media.

Examples of conversions of matter which may be conducted with particular advantages in the Taylor reactor of the invention are the buildup or breakdown of oligomeric and high molecular mass substances, such as the polymerization of monomers in bulk, solution, emulsion or suspension, or by precipitation polymerization.

Further examples of such conversions are polymer-analogous reactions, such as the esterification, amidation or urethanization of polymers containing side groups suitable for such reactions, the preparation of olefinically unsaturated materials curable using electron beams or ultraviolet light, the preparation of polyurethane resins and modified polyurethane resins such as acrylated polyurethanes, the preparation of (poly)ureas or modified (poly)ureas, the molecular weight buildup of compounds terminated by isocyanate groups, or reactions which lead to the formation of mesophases, as described, for example, by Antonietti and Göltner in the article "Überstruktur funktioneller Kolloide: eine Chemie im Nanometerbereich [Superstructure of functional colloids: A chemistry in the nanometer range]" in Angewandte Chemie 109 (1997) 944 to 964 or by Ober and Wengner in the article "Polyelectrolyte-Surfactant Complexes in the Solid State: Facile Building Blocks for Self-Organizing Materials" in Advanced Materials, 9 (1997) 1, 17 to 31.

With very particular advantage, the process of the invention is employed for the polymerization of olefinically unsaturated monomers in bulk, since in this case the particular advantages of the Taylor reactor of the invention are manifested with particular clarity.

Accordingly, the Taylor reactor of the invention is used with particular preference for the preparation of polymers and copolymers of chemically uniform composition. In the case of copolymerization, the more rapidly polymerizing comonomer or comonomers can be metered in by way of feeds disposed in succession in the axial direction, so that the comonomer ratio can be kept constant over the entire length of the reactor.

The Taylor reactor is also used with particular advantage for graft copolymerization.

In this utility, the so-called backbone polymer may be prepared separately and metered into the Taylor reactor of the invention via a separate feed or in a mixture with at least one monomer.

Alternatively, in a first subsection of the Taylor reactor of the invention, the backbone polymer may be prepared, after which at least one monomer which forms the graft branches is metered in by way of at least one further feed, offset in the axial direction. Subsequently, the monomer or comonomers may then be grafted onto the backbone polymer in at least one further subsection of the Taylor reactor of the invention. Where two or more comonomers are used, they may be metered in individually by way of one feed in each case or as a mixture, by one or more feeds. Where at least two comonomers are metered in individually and in succession by at least two feeds it is even possible to prepare graft branches which per se are block copolymers, in a particularly simple and elegant manner.

Of course, this concept as described above may also be used to prepare block copolymers per se.

Analogously, the preparation of core/shell latices may be realized in a particularly simple and elegant manner with the aid of the Taylor reactor of the invention. Initially, in the first subsection of the Taylor reactor of the invention, the core is prepared by polymerizing at least one monomer. By way of at least one further feed, at least one further comonomer is metered in and the shell is polymerized onto the core in at least one further subsection. In this way it is possible to apply a plurality of shells to the core.

The preparation of polymer dispersions may also take place with the aid of the Taylor reactor of the present invention. For example, at least one monomer in a homogeneous phase, especially in solution, is (co)polymerized in a first subsection of the Taylor reactor of the invention, after which a precipitant is metered in by way of at least one further feed, resulting in the polymer dispersions.

For all applications, the Taylor reactor of the invention has the particular advantage of a large specific cooling area which allows a particularly safe reaction regime.

With very particular preference, The Taylor reactor of the invention is used for the continuous preparation of (co)polymers, block copolymers and graft copolymers by free-radical, anionic or cationic, especially free-radical, (co)polymerization, block copolymerization or graft copolymerization (polymerization) of at least one olefinically unsaturated monomer in bulk by the process of the invention.

Examples of monomers suitable for the process of the invention are acyclic and cyclic, unfunctionalized and functionalized monoolefins and diolefins, vinylaromatic compounds, vinyl ethers, vinyl esters, vinyl amides, vinyl halides, allyl ethers and allyl esters, acrylic acid and methacrylic acid and their esters, amides and nitriles, and maleic acid, fumaric acid and itaconic acid and their esters, amides, imides and anhydrides.

Examples of suitable monoolefins are ethylene, propylene, 1-butene, 1-pentene, 1-hexene, 1-heptene, 1-octene, cyclobutene, cyclopentene, dicyclopentene and cyclohexene.

Examples of suitable diolefins are butadiene, isoprene, cyclopentadiene and cyclohexadiene.

Examples of suitable vinylaromatic compounds are styrene, alpha-methylstyrene, 2-, 3- and 4-chloro-, -methyl-, -ethyl-, -propyl- and -butyl- and -tert-butylstyrene and -alpha-methylstyrene.

An example of a suitable vinyl compound or of a functionalized olefin is vinylcyclohexanediol.

Examples of suitable vinyl ethers are methyl, ethyl, propyl, butyl and pentyl vinyl ether, allyl monopropoxylate, and also trimethylolpropane monoallyl, diallyl and triallyl ether.

Examples of suitable vinyl esters are vinyl acetate and vinyl propionate and also the vinyl esters of Versatic acid and of other quaternary acids.

Examples of suitable vinyl amides are N-methyl-, N,N-dimethyl-, N-ethyl-, N-propyl-, N-butyl-, N-amyl-, N-cyclopentyl- and N-cyclohexylvinylamide and also N-vinylpyrrolidone and epsilon-caprolactam.

Examples of suitable vinyl halides are vinyl fluoride and vinyl chloride.

Examples of suitable vinylidene halides are vinylidene fluoride and vinylidene chloride.

Examples of suitable allyl ethers are methyl, ethyl, propyl, butyl, pentyl, phenyl and glycidyl monoallyl ether.

Examples of suitable allyl esters are allyl acetate and allyl propionate.

Examples of suitable esters of acrylic acid and methacrylic acid are methyl, ethyl, propyl, n-butyl, isobutyl, n-pentyl, n-hexyl, 2-ethylhexyl, isodecyl, decyl, cyclohexyl, t-butylcyclohexyl, norbornyl, isobornyl, 2- and 3-hydroxypropyl, 4-hydroxybutyl, trimethylolpropane mono-, pentaerythritol mono- and glycidyl (meth)acrylate. Also suitable are the di-, tri- and tetra(meth)acrylates of ethylene glycol, di-, tri- and tetraethylene glycol, propylene glycol, dipropylene glycol, butylene glycol, dibutylene glycol, glycerol, trimethylolpropane and pentaerythritol. However, they are used not alone but always in minor amounts together with the monofunctional monomers.

Examples of suitable amides of acrylic acid and methacrylic acid are (meth)acrylamide and also N-methyl-, N,N-dimethyl-, N-ethyl-, N-propyl-, N-butyl-, N-amyl-, N-cyclopentyl- and N-cyclohexyl(meth)acrylamide.

Examples of suitable nitriles are acrylonitrile and methacrylonitrile.

Examples of suitable esters, amides, imides and anhydrides of maleic acid, fumaric acid and itaconic acid are dimethyl, diethyl, dipropyl and dibutyl maleate, fumarate and itaconate, maleamide, fumaramide and itaconamide, N,N'-dimethyl-, N,N,N',N'-tetramethyl-, N,N'-diethyl-, N,N'-dipropyl-, N,N'-dibutyl-, N,N'-diamyl-, N,N'-dicyclopentyl and N,N'-dicyclohexyl-maleamide, -fumaramide and -itaconamide, maleimide, fumarimide and itaconimide, and N-methyl-, N-ethyl-, N-propyl-, N-butyl-, N-amyl-, N-cyclopentyl- and N-cyclohexyl-maleimide, fumarimide and -itaconimide, and also maleic, fumaric and itaconic anhydride.

The monomers described above may be polymerized free-radically, cationically or anionically. Advantageously, they are polymerized free-radically. For this purpose, the customary and known inorganic free-radical initiators may be used, such as hydrogen peroxide or potassium peroxodisulfate, or the customary and known organic free-radical initiators, or other initiators, such as dialkyl peroxides, e.g., di-tert-butyl peroxide, di-tert-amyl peroxide and dicumyl peroxide; hydroperoxides, e.g., cumene hydroperoxide and tert-butyl hydroperoxide; per esters, e.g. tert-butyl perbenzoate, tert-butyl perpivalate, tert-butyl per-3,5,5-trimethylhexanoate and tert-butyl per-2-ethylhexanoate; bisazo compounds such as azobisisobutyronitrile; or C—C initiators such as 2,3-dimethyl-2,3-diphenyl-butane or -hexane. Also suitable, however, is styrene, which initiates polymerization thermally even without free-radical initiators.

In the process of the invention, at least one of the above-described monomers is metered via a side feed into the inlet region of the Taylor reactor of the invention. Preferably, at least one of the above-described free-radical initiators or other initiators is metered in via a further side feed, preferably together with at least one monomer.

The monomer or monomers is or are polymerized in the annular reaction volume at least partly under the conditions of Taylor flow. The resulting liquid polymer is conveyed from the annular reaction volume into the outlet region and from there into the product offtake, and is discharged by the pressure maintenance valve.

In the process of the invention, the conditions for Taylor flow are preferably met in part of the annular reaction volume or in the whole of the annular reaction volume, particularly in the whole of the annular reaction volume.

In the process of the invention, the temperature of the reaction medium may vary widely and is guided in particular by the monomer having the lowest decomposition temperature, by the temperature at which depolymerization sets in, and by the reactivity of the monomer or monomers and initiators. The polymerization is preferably conducted at temperatures from 100 to 200° C., more preferably from 130 to 180° C., and in particular from 150 to 180° C.

The polymerization may be conducted under superatmospheric pressure. The pressure is preferably from 1 to 100 bar, more preferably from 1 to 25 bar, and in particular from 1 to 15 bar.

The transit time may vary widely and is guided in particular by the reactivity of the monomers and the size, especially the length, of the Taylor reactor of the invention. The transit time is preferably from 15 minutes to 2 hours, in particular from 20 minutes to 1 hour.

It is a very particular advantage of the Taylor reactor of the invention and of the process of the invention that the conversion of the monomers is >70 mol %. It is surprisingly possible without problems to achieve conversions >80, preferably >90, with particular preference >95, with very particular preference >98, and in particular >98.5 mol %. In the course of such conversions it is possible, as is common with polymerization in bulk, for the kinematic viscosity v to be multiplied by a factor of at least 10, in particular at least 100.

The molecular weight of the polymers prepared by means of the process of the invention may vary widely and is limited essentially only by the maximum kinematic viscosity v at which the Taylor reactor of the invention is able to maintain the conditions of Taylor flow. The number-average molecular weights of the polymers prepared by the procedure of the invention are preferably from 800 to 50 000, more preferably from 1000 to 25 000, and in particular from 1000 to 10 000 daltons. Preferably, the polydispersity of the molecular weight is <10, in particular <8.

THE BRIEF DESCRIPTION OF THE DRAWINGS

FIG. 1 shows a preferred embodiment of the Taylor reactor of the invention, in a diagrammatic representation.

In FIG. 1, the reference numerals have the following meanings:

(1) Taylor reactor,
(2) annular reaction volume,
(3) outer reactor wall,
(4) rotor,
(4.1) rotatably mounted end of the rotor (4),
(4.2) unmounted end of the rotor (4),
(5) reactor floor,
(6) floating ring seal,
(7) drive shaft,
(8) inlet region,
(8.1) side feeds in the inlet region (8),
(9) outlet region,
(10) product offtake,
(10.1) the end of the product offtake opposite the outlet region (9),
(11) pressure maintenance valve, and
(12) mixing means (optional).

Owing to the high conversions, the process of the invention is particularly economic, since there is no need for the subsequent separation of unreacted monomers and their recycling into the reaction medium. As a result, however, all of the safety, process engineering, toxicological and environmental problems and instances of odor nuisance that are associated with a high monomer content disappear. Moreover, the process of the invention may be operated for a particularly long time without any instances of bubble formation and/or agglomeration of polymers. As a result, particularly high yields of polymers are achieved.

The polymers prepared by the procedure of the invention have particular advantages. Thus they are outstandingly suitable for all applications as are commonly envisaged for polymers, such as, for example, the production of moldings and films. In particular, however, they are suitable as components for coating materials, adhesives and sealing compounds. They are used in particular as binders, since the coating materials, adhesives and sealing compounds which comprise or consist of the binders prepared by the procedure of the invention have particularly outstanding performance properties.

The particular advantages of the process of the invention and of the binders prepared by it are evident in particular from the coating materials which comprise the binders in question. Depending on their composition, these coating materials are physically drying or are cured thermally, with actinic light, especially UV light, or by means of electron beams.

They are present as powder coating materials, powder slurry coating materials, coating materials dissolved in organic media, aqueous coating materials or substantially or fully solvent- and water-free liquid paints (100% systems). They may comprise color and/or effect pigments. They are used as architectural coatings for the interior and exterior sectors, as coating materials for furniture, doors, windows, hollow glassware, coils, containers, white goods and other industrial applications, as automobile finishes for original equipment (OEM), or as automotive refinishes. In the context of their use in the automobile sector, they are suitable as electrodeposition coating materials, primer-surfacers, solid-color topcoats, basecoats, and clearcoats.

EXAMPLE

The Continuous Preparation of a Copolymer by Means of the Process of the Invention The copolymer was prepared using the inventive Taylor reactor (1) of FIG. 1. The Taylor reactor was operated in the perpendicular position, with the flow direction being against gravity. All of the plant components were heatable by way of a jacket. This jacket was subdivided, with the conical part of the outer reactor wall (3) having two heating zones and the other plant components only one heating zone each. The temperature of the Taylor reactor (1) was controlled by means of two thermostats. The first thermostat was connected to the lower heating zone of the outer reactor wall (3) in the region of the annular reaction volume (2). The temperature of the remaining heating zones was controlled via the second thermostat. The temperatures of the reaction medium and of the copolymer in the outlet region (9) were regulated by hand by adjusting the thermostat temperatures. A temperature of 160° C. was set.

The Taylor reactor of the invention had an annular reaction volume (2) of 1666 ml. The volume of the outlet region (9) was 287 ml. The speed of the rotor (4) was 300 rpm. The polymerization was conducted at 160° C. and 2 bar. The residence time or transit time was 35.3 minutes, the duration of the experiment 4 hours.

The Taylor reactor (1) was filled completely with the organic solvent Shellsol® in order to build up the required polymerization pressure, via the pressure maintenance valve (11), and to set the polymerization temperature. The rotor (4) was set in operation before the feed streams were metered in. The organic solvent was subsequently displaced by the monomer and initiator feed streams. The initial copolymer fraction was discarded.

For the copolymerization, a monomer mixture consisting of 2881.5 g of styrene, 3006.8 g of methyl methacrylate and 4510.2 g of hydroxypropyl methacrylate, with a mass flow of 43.33 g/min, was mixed with a mixture consisting of 43.8 g of di-tert-butyl peroxide (DTBP), 20.3 g of tert-butyl peroxyethylhexanoate (TBPEH), 587.6 g of dicumyl peroxide (DCP) and 2129.8 g of tert-butylcyclohexyl acrylate, with a mass flow of 12.02 g/min. The resulting mixture was metered into the inlet region (8) via a side feed (8.1), with a mass flow of 55.35 g/min. Mixing and metering were carried out by means of computer-controlled piston membrane pumps. During polymerization, the pressure was regulated by hand at the pressure maintenance valve (11).

The polymer resulting after the initial fraction was discharged continuously via the pressure maintenance valve (11) and was passed through an insulated pipe into a collection vessel. The key properties of the polymer were determined at regular intervals of time (1, 2 and 3 hours). The profile of properties of the polymer remained constant during the continuous bulk polymerization. Its number-average molecular weight was 2827 daltons and its mass-average molecular weight 16 089 daltons. The polydispersity of the molecular weight, accordingly, was 5.7. The degree of conversion, determined by means of gas chromatography, was 99.1 mol %. The melt viscosity of the polymer at 160° C. was 4.24 Pas, therefore higher by a factor of approximately $2 \times 10^3$ than the viscosity of the reaction medium in the inlet region (8).

The polymer was outstandingly suitable for the preparation of coating materials, adhesives, and sealing compounds.

What is claimed is:

1. A Taylor reactor comprising
   1) an annular reaction volume which
      1.1 widens in a flow direction of a reaction medium and opens into an outlet region and is defined by
         1.1.1 an outer reactor wall,
         1.1.2 a reactor floor having a seal for a drive shaft, and
         1.1.3 a concentrically disposed rotor which at one end is mounted rotatably in the reactor floor and at its other end below the outlet region is unmounted, the rotor having the largest diameter at its mounted end or having the same diameter as at its unmounted end,
   2) an inlet region in the narrowest region of the annular reaction volume above the reactor floor, having at least one side feed and/or at least one feed through the reactor floor for reactants and/or process media,
   3) the outlet region being dead space free and
      3.1 is disposed above the unmounted end of the rotor and above the annular reaction volume,
      3.2 widens further or remains constant beyond the annular reaction volume in the flow direction, and
      3.3 thereafter tapers to a product offtake,
   4) a deadspace-free product offtake which
      4.1 at its greatest diameter opens toward the outlet region and
      4.2 tapers in the other direction, and
   5) at an end of the product offtake opposite the outlet region, a pressure maintenance valve.

2. The Taylor reactor of claim 1, wherein the annular reaction volume has a circular circumference.

3. The Taylor reactor of claim 1, wherein the annular reaction volume widens continuously or discontinuously in accordance with a desired mathematical function.

4. The Taylor reactor of claim 3, wherein the mathematical function is selected from the group consisting of straight lines, at least two straight lines which intersect at an obtuse angle, hyperbolas, parabolas, e functions, or combinations of these functions which undergo continuous or discontinuous transition one to another.

5. The Taylor reactor of claim 4, wherein the reaction volume widens continuously.

6. The Taylor reactor of claim 4, wherein the mathematical function is straight lines.

7. The Taylor reactor of claim 1, wherein the outer reactor wall is cylindrical and the rotor is conical, and the rotor has its greatest diameter at its mounted end.

8. The Taylor reactor of claim 1, wherein the outer reactor wall is conical and the rotor is cylindrical.

9. The Taylor reactor of claim 1, wherein the unmounted end of the rotor is one of planar, rounded off, or conical.

10. The Taylor reactor of claim 1, wherein the seal is a floating ring seal.

11. The Taylor reactor of claim 1, wherein mixing and metering of the reactants and/or the process media are carried out by a computer-controlled piston membrane pump.

12. A process comprising transforming matter in the Taylor reactor of claim 1 under conditions of Taylor flow, where kinematic viscosity v of the reaction medium increases in the direction of flow traversal.

13. The process of claim 12, wherein the transforming matter comprises a reaction to form one of polymers, copolymers, block copolymers, graft copolymers, polycondensation products, polyaddition products, core/shell latices, or polymer dispersions.

14. The process of claim 13, wherein the transforming matter comprises reacting at least one olefinically unsaturated monomer to form one of a (co)polymer, a block copolymer, or a graft copolymer, wherein the reacting is one of free-radical, anionic or cationic (co)polymerization, block copolymerization, or graft copolymerization.

15. A process for continuous preparation of (co)polymers, block copolymers and graft copolymers (polymers) by free-radical, anionic or cationic (co)polymerization, block copolymerization, or graft copolymerization (polymerization) of at least one olefinically unsaturated monomer in bulk in the Taylor reactor of claim 1 comprising (I) metering at least one olefinically unsaturated monomer via the at least one side feed and/or the at least one feed through the reactor floor into the inlet region, the inlet region being situated in the narrowest region of the annular reaction volume above the reactor floor, and (II) polymerizing in the annular reaction volume at least partly under the conditions of Taylor flow to form a polymer, (III) conveying the liquid polymer from the annular reaction volume into the deadspace-free outlet region, (IV) conveying the polymer from the outlet region into the deadspace-free product offlake, and (V) discharging the polymer by way of the pressure maintenance valve.

16. The process of claim 15, wherein the conditions for Taylor flow are met in a part of the annular reaction volume or in the whole annular reaction volume.

17. The process of claim 15, wherein the polymerization is conducted at a temperature of from 100 to 200° C.

18. The process of claim 15, wherein the polymerization is conducted at a pressure of from 1 to 100 bar.

19. The process of claim 15, wherein transit time is from 15 minutes to 2 hours.

20. The process of claim 15, wherein conversion is <70 mol%.

21. The process of claim 15, wherein kinematic viscosity v of the reaction medium increases by a factor of at least 10 in the direction of flow traversal.

22. The process of claim 21, wherein the kinematic viscosity v of the reaction medium increases by a factor of at least 100 in the direction of flow traversal.

23. The process of claims 15, wherein a number-average molecular weight of the polymers is from 800 to 50 000.

24. A Taylor reactor comprising:

1) an annular reaction volume generally in the form of a truncated cone having a first region and a second region, the first region having a volume greater than the second region, the annular reaction volume widening in a flow direction of a reaction medium from the first region to the second region and opening into an outlet region, the annular reaction volume including an outer reactor wall, a reactor floor having a seal for a drive shaft in the first region and a concentrically disposed rotor which is rotatably mounted in the reactor floor at a first end;

2) an inlet in the first region above the reactor floor;

3) the outlet region being dead-space free and being disposed above an end of the rotor and above the annular reaction volume and tapering inwardly toward a product off-take;

4) a dead-space-free product off-take generally in the form of a truncated cone having a first off-take region and a second off-take region, the first off-take region adjacent the outlet region and having a volume greater than the second off-take region; and 5) a pressure maintenance valve adjacent the second off-take region.

* * * * *